United States Patent [19]
Wilson

[11] Patent Number: 4,959,120
[45] Date of Patent: Sep. 25, 1990

[54] DEMETALLIZATION OF METAL FILMS

[75] Inventor: David Wilson, Mississauga, Canada
[73] Assignee: Golden Valley Microwave Foods, Inc., Edina, Minn.

[21] Appl. No.: 369,193
[22] Filed: Jun. 21, 1989
[51] Int. Cl.[5] ........................ B44C 1/22; C23F 1/02; C05C 15/00; C05C 25/06
[52] U.S. Cl. ........................ 156/651; 156/656; 156/659.1; 156/665; 428/209
[58] Field of Search ............... 156/629, 630, 633, 634, 156/651, 656, 659.1, 661.1, 664, 665; 219/10.55; 428/195, 209

[56] References Cited

U.S. PATENT DOCUMENTS

| | | | |
|---|---|---|---|
| 3,647,508 | 3/1972 | Gorell | 117/38 |
| 4,230,924 | 10/1980 | Brastad | 219/10.55 E |
| 4,258,086 | 3/1981 | Beall | 219/10.43 |
| 4,267,420 | 5/1981 | Brastad | 219/10.55 E |
| 4,398,994 | 8/1983 | Beckett | 156/659.1 |
| 4,517,045 | 5/1985 | Beckett | 156/345 |
| 4,552,614 | 11/1985 | Beckett | 156/640 |
| 4,610,755 | 9/1986 | Beckett | 156/634 |
| 4,641,005 | 2/1987 | Seiferth | 219/10.55 E |
| 4,678,882 | 7/1987 | Bohrer | 219/10.55 E |
| 4,685,997 | 8/1987 | Beckett | 156/629 |
| 4,735,513 | 4/1988 | Watkins et al. | 383/116 |
| 4,878,765 | 11/1989 | Watkin et al. | 383/116 |
| 4,883,936 | 11/1989 | Maynard et al. | 219/10.55 F |

FOREIGN PATENT DOCUMENTS

| | | |
|---|---|---|
| 0205304 | 12/1986 | European Pat. Off. . |
| 0282015 | 9/1988 | European Pat. Off. . |

*Primary Examiner*—William A. Powell
*Attorney, Agent, or Firm*—James V. Harmon

[57] ABSTRACT

A selectively demetallized metal film is provided in which the metal film has different amounts of metal removed in different areas to provide a film having a graduated optical density from one area to another. The amount of metal present in the film can vary gradually and continuously or in stages resulting in a series of bands or patches. Each portion of the film appears uniform, homogeneous and uninterrupted to the unaided eye. The product is produced by providing a substrate such as plastic film having a thin semiconductive metal film coated thereon. Different amounts of the metal are removed from the film in different areas, preferably by exposing the metal film in different areas to different amounts of an etchant which can be provided in the form of minute droplets of one size in one area and of a different size in a different area. The etchant can be applied by halftone printing as variably sized dots on uniformly fixed centers with larger dots of etchant applied in some areas than in others to remove a greater amount of the metal.

14 Claims, 3 Drawing Sheets

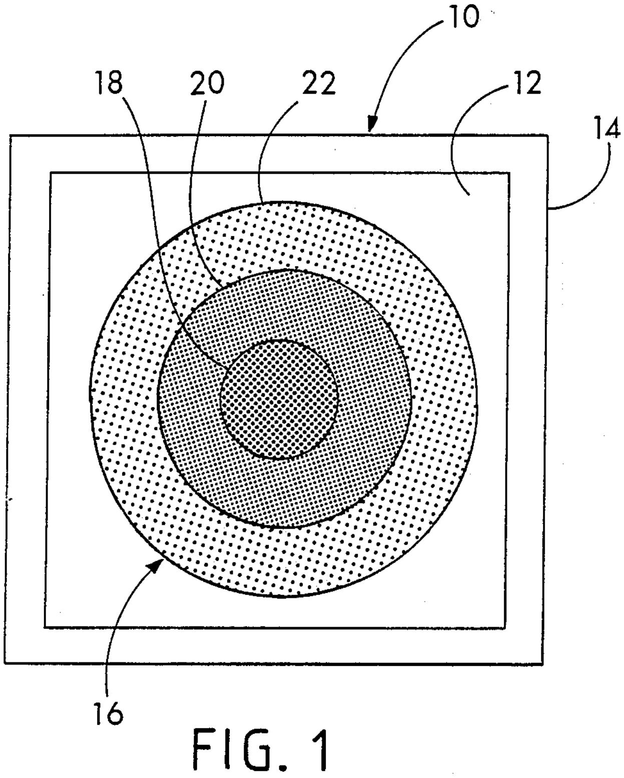
FIG. 1
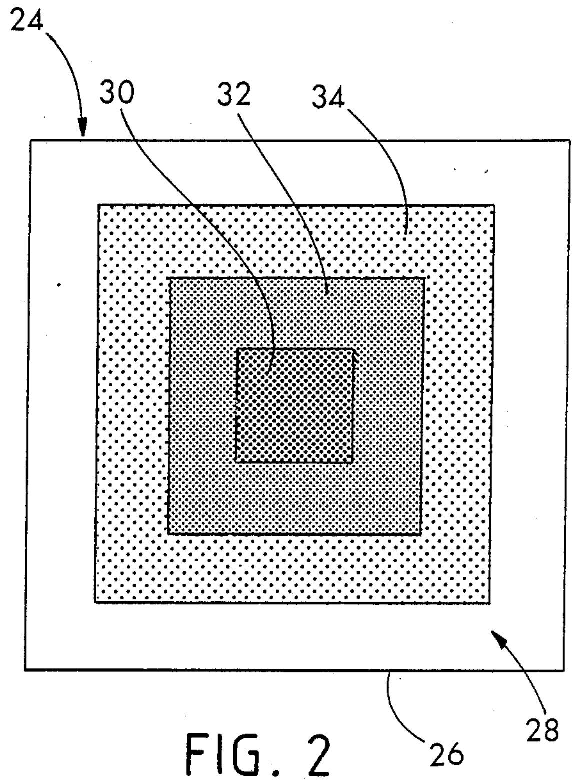
FIG. 2
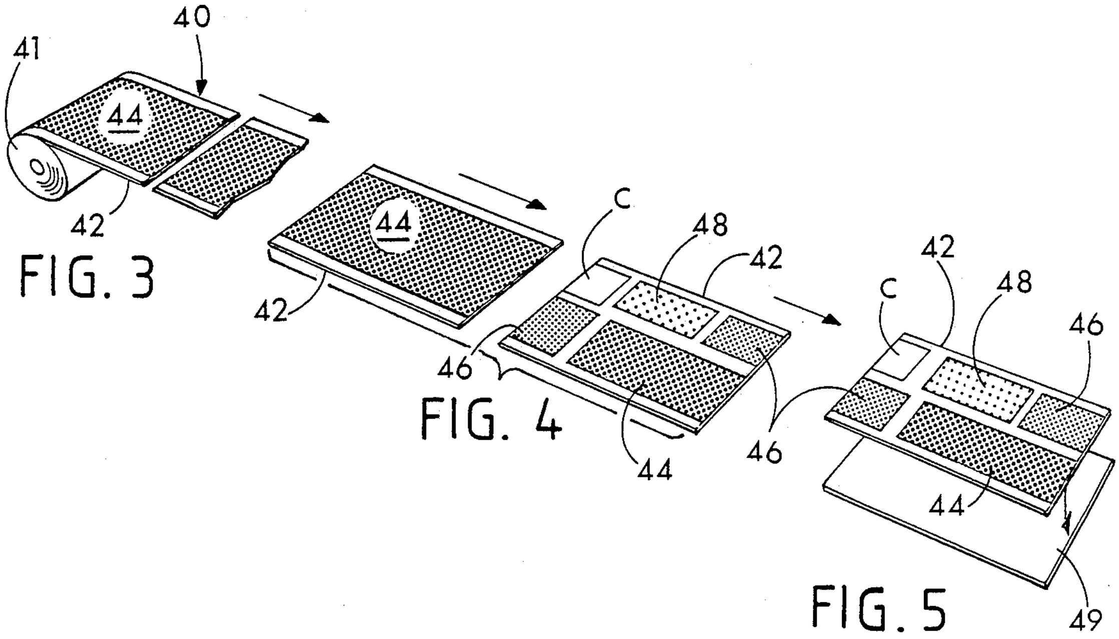
FIG. 3
FIG. 4
FIG. 5

DEMETALLIZATION OF METAL FILMS

FIELD OF THE INVENTION

The present invention relates to the demetallization of metal films and to the provision of a microwave susceptor in which different portions produce different amounts of heat.

BACKGROUND OF THE INVENTION

It is known to use a thin film of metal deposited on a flexible substrate such as a plastic sheet by vacuum electrodeposition for the purpose of heating foods in a microwave oven. Heaters of this kind which are known as susceptors provide a more intense heating effect at the surface of the food. The film of metal is thin enough to be electrically semiconductive so that during the heating process an electric current induced into the metal film from the electromagnetic field of the microwave oven produces $I^2R$ losses which heat the food. The heating of food products by means of semiconductive vacuum electrodeposited metal films is exemplified by U.S. Pat. Nos. 4,230,924; 4,268,420; 4,258,086; 4,735,513; 4,641,005 and 4,678,882, and European patent application 0 205 304. In order to produce patches, i.e. rectangular metallized areas, the parts of the metallized film surrounding the patch are removed, i.e. totally demetallized, for example by the application of a caustic solution to the area that is to be removed. The dissolved metal is then washed off.

The demetallization of a metallized film is described for example in European application 0 205 304 and U.S. Pat. Nos. 3,647,508; 4,398,994; 4,522,614; and 4,735,513. The metal film is removed either by applying a caustic solution directly to the metal film or by covering portions of the metal film with a protective varnish and thereafter exposing the entire surface to caustic which dissolves the metal exposed beyond the edges of the varnish layer.

In the method described in U.S. Pat. No. 4,258,086, metal is removed by minute currents which pass between electrically conductive metal foil squares held adjacent to the coated film that is being treated. Using these methods, Beall and Brastad prepared demetallized films that have visible rectangular metallized patches or islands as small as 1/32nd inch on a side. These sheets are entirely covered with uniformly spaced visible rectangles. As a result, the heat produced by the sheet in a microwave oven is uniform throughout the entire sheet.

It is a primary object of the present invention to provide an improved method of partially demetallizing metal films so as to provide a metal film with gradations in optical density. Another object is to provide a semiconductive metallized film which is capable of producing differential heating, i.e. different amounts of heat in different areas thereof when exposed to microwave energy in a microwave oven. Yet another object is to provide a metallized sheet which is partially demetallized and wherein the degree of demetallization can be precisely controlled to thereby vary the optical density of the coating from one portion thereof to another for decorative or heating applications. A further object is to provide a demetallized metal film of the type described wherein the partially demetallized portions appear uniform, homogeneous and uninterrupted to the naked eye. Another object is to provide a unique microwave susceptor having a heating patch or target adapted to provide "focused" heating so as to produce a higher temperature near the center and a lower temperature at the periphery. Still another object is to provide a partially demetallized, semiconductive metal susceptor for microwave heating which is economical to produce, practical to manufacture, wherein the heat produced in different areas can be precisely controlled, and the various areas producing different amounts of heat can be given any desired shape.

SUMMARY OF THE INVENTION

The invention provides a nonconductive backing formed from sheet material with an electrically semiconductive metal film thereon having a selected resistivity and optical density in one portion thereof and a different resistivity and optical density in another portion. The backing can comprise sheet material such as paper or a flexible plastic film. The product thus has different regions with gradations in resistivity and optical density. As a result, the different areas of the film will absorb or reflect different amounts of light to produce unique visual effects for decorative purposes as well as producing different amounts of heat when exposed to microwave energy in a microwave oven.

The amount of metal present in the film can vary gradually and continuously or in stages resulting in a series of bands or patches. The terms "graduated" and "gradations" herein are used broadly to encompass both forms. The resulting semiconductive coated products are supple, flexible and can be made with numerous areas, each of any desired shape and each area adapted to produce a different amount of heat. Moreover, the various differentially metallized areas appear uniform, homogeneous and uninterrupted to the unaided eye. Several metal coated areas can be made to appear as various shades of grey or, under some conditions, reflective of light to different degrees.

In accordance with one preferred process used for producing the present invention, a nonconductive substrate or base such as plastic film having a thin, preferably uniform, metal film thereon is provided as the starting material. The metal film has electrical characteristics which produce heat when the susceptor is placed in a microwave oven. In accordance with the present invention, different amounts of metal are removed from the initially uniform metal film in different areas or regions thereof to provide differences in the resistivity and the optical density of the metal film from one area to another. As a result, different regions of the metal film produce different amounts of heat when exposed to microwave energy in a microwave oven.

In one preferred process, the metal film is partially removed by exposing different regions of the metal film to different amounts of an etchant. The etchant can be provided in the form of minute droplets of one size in one area and of a different size in a different area of the metal film. This treatment removes more metal in one area than in another. The metal can be removed in accordance with the invention by halftone printing of an etchant or a mask for an etchant onto the metal film. The etchant is applied as variably sized dots on uniform fixed centers, with larger dots of the etchant applied in some areas than in others, thereby removing more metal in some areas than in others.

The invention will be better understood by reference to the following illustrative embodiments which set forth by way of example some of the various forms of the invention within the scope of the appended claims.

THE FIGURES

FIG. 1 is a plan view of a susceptor for microwave heating in accordance with the invention;

FIG. 2 is a view of another susceptor similar to FIG. 1;

FIG. 3 is a perspective view showing the first stage of forming another product in accordance with the invention;

FIG. 4 is a perspective view showing partial demetallization of the sheet illustrated in FIG. 3;

FIG. 5 is a perspective view showing a sheet prepared in FIG. 4 as it is being laminated to a paper backing;

DETAILED DESCRIPTION

Figure 6:
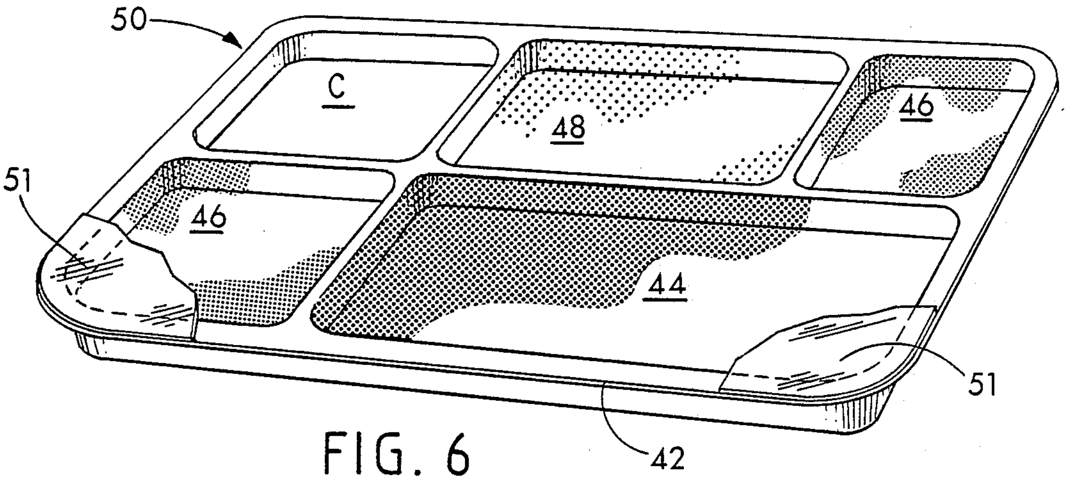
FIG. 6 is a perspective view of a frozen dinner tray prepared from the laminate of FIG. 5 for heating foods in a microwave oven.

Refer to FIGS. 1 and 2 which illustrate typical products in accordance with the present invention. The products of FIGS. 1 and 2 similar except that the pattern of FIG. 1 is circular while FIG. 2 illustrates a square pattern. Both forms illustrate the use of the invention as a susceptor for heating products such as food in a microwave oven by absorbing microwave energy and converting the energy into heat which is transferred to the food by conduction.

In FIG. 1 the susceptor 10 includes a backing 12 formed from flexible sheet material, in this case a plastic film such as one-half mil polyester (Mylar®) film, bonded with adhesive, e.g. a polyvinyl acetate emulsion adhesive, to a support sheet 14 such as food grade paperboard. The film 12 has applied to it a semiconductive metal coating 16. The metal coating 16 is preferably applied by vapor deposition under vacuum. Initially the coating 16 uniformly covers the entire surface of the backing film 12. Portions, however, of the metal film 16 are removed as will be described to provide a center area 18, an inner ring 20 and an outer ring 22. Little, if any, of the metal is removed from the center area 18, while progressively greater amounts of metal are removed from the rings 20 and 22. Each of the areas 18–22 appear uniform, homogeneous and uninterrupted to the unaided eye. The area 18 appears medium to dark grey and slightly reflective. The ring 20 appears to be a medium grey and ring 22 appears to be light grey. The susceptor indicated generally at 24 in FIG. 2 includes a backing 26 such as flexible plastic film, upon which the metallized coating indicated generally at 28 is applied, that is bonded to a paper or paperboard supporting sheet. Similarly, in the case of FIG. 2 the central area 30 appears darkest, the first ring 32 appears to be a somewhat lighter shade of uniform grey and the outermost ring 34 appears as a light grey uniform ring. All three areas are homogeneous, uniform and uninterrupted.

A variety of metals can be used including but not limited to aluminum, copper, nickel, zinc, gold, silver, tin and stainless steel. The backing 12 can be a suitable plastic including polyester (Mylar®), polyetherimide (Danar®; Dixon Industries; Bristol, RI) or smooth paper and, for products which are not heated, polyethylene, polypropylene, cellophane, saran, cellulose, acetate and the like.

Figure 8:
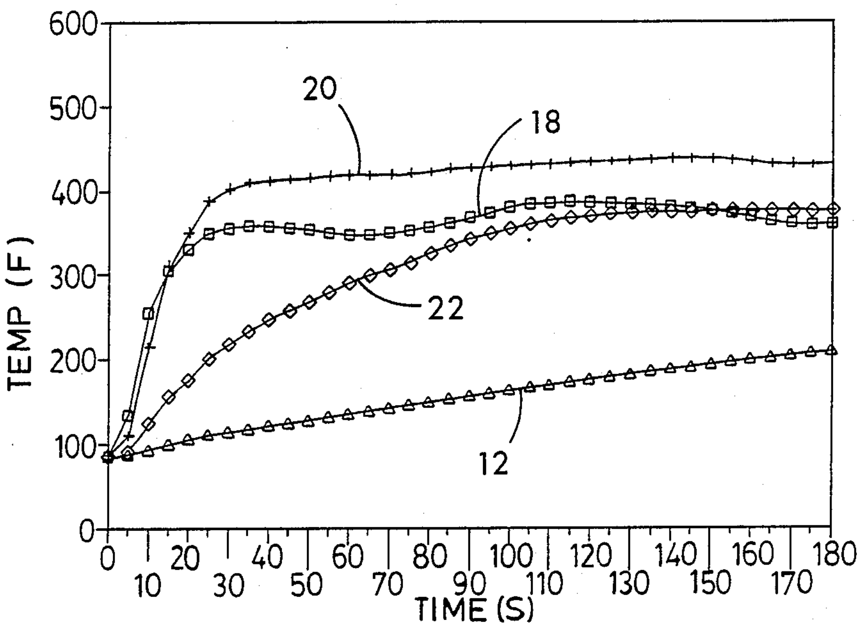
FIG. 8 is a graph showing temperatures reached in four different portions of the susceptor of FIG. 1.

In the embodiments illustrated in FIGS. 1 and 2 little or no metal has been removed from central areas 18 and 30, whereas a substantial fraction of the metal has been removed from the rings 20, 22 and 32, 34 to provide progressive gradations in the resistivity as well as in the amount of light that will be transmitted, i.e. the optical density of the metal film in these areas, progressing from the greatest optical density at the center to the least at the outer edge. In the area surrounding rings 22 and 34 all of the metal coating has been removed. When the susceptors are placed in a microwave oven each ring 20, 22 and 32, 34 produces a different amount of heat when exposed to microwave energy. The heat produced over a period of three minutes in each portion of the susceptor is shown in FIG. 8.

The embodiments of FIGS. 1 and 2 are especially useful for heating various foods that have a tendency to be moist or soggy at the center. To counteract the sogginess, the center portion 18 or 30 heats the fastest, rings 20 and 32 heat at a somewhat slower rate at least initially, and rings 22 and 34 heat even more slowly. The ring 20 or 32 as the case may be, may however reach a higher final temperature than the center area 18 or 30, as shown in FIG. 8.

Refer now to FIGS. 3–6 which illustrate the stages for producing another form of microwave susceptor for heating foods in a microwave oven.

As shown in FIG. 3, a thin flexible strip of plastic film 42 unwound from a supply roll 41 travels during the manufacturing operation from left to right in the figures. The film 42 has already been pre-coated at 44 with a semiconductive layer of aluminum which can be from about 5Å to about 1200Å in thickness. The electrical characteristics of the metal film cause it to become hot in a microwave oven. The metal coating 44 as shown in FIG. 4 covers the entire film except, in this case, the extreme edges which were not coated. The coating in this case was accomplished by vapor metallization with aluminum to provide a coating 44 of uniform thickness. Various amounts of metal are removed in different areas of the film as shown in FIG. 4. In this example no metal is removed from the coated area 44 which appears as a dark rectangle in the lower right portion of the cut sheet. A fraction, say 20%, of the metal film is removed from rectangular areas 46 at opposite corners of the sheet which appear medium grey in color and completely uniform throughout, while a still greater amount of metal, say 30%, is removed in the rectangular area 48 which appears to have a grey color of a somewhat lighter shade than the areas 46. In the remaining area which forms a compartment C in the upper left corner, all of the metal coating 44 has been removed so that the film 42 appears clear and transparent.

In FIG. 5 the differentially coated sheet 42 is shown being laminated to a sheet of paperboard 49 which functions as a support. After the sheets 42 and 49 have been laminated together by means of an adhesive, they are pressed into the shape shown in FIG. 6 to provide a food storage and serving tray having five compartments for various foods requiring heating to different degrees in a microwave oven. The area 44 which contains the most metal will heat most rapidly, the compartments containing metal coatings designated 46 will heat to a moderate degree. The compartment containing the coated area 48 will produce even less heat. No heat will be produced in the compartment C which can be used for a food that requires no surface heating. In this way a package is provided which includes a number of different areas adapted to heat differentially. The heat is provided by means of a susceptor having gradations in resistivity and optical density to produce different amounts of heat in different areas as required. This results from the several gradations of metal removed by pattern demetallization of the metallized sheet 42. After the food has been placed in the tray 50, a cover 51 (only a small portion of which is shown) can be bonded over the top of the tray to provide a package for storing and shipping a complete meal that is to be heated to different degrees in different areas when placed in a microwave oven. Thus the tray 50 provides a metal film with a plurality of optical densities as required for each of several different foods requiring different amounts of heat. The temperature reached by each food varies with the optical density of the metal film that remains.

Figure 7:
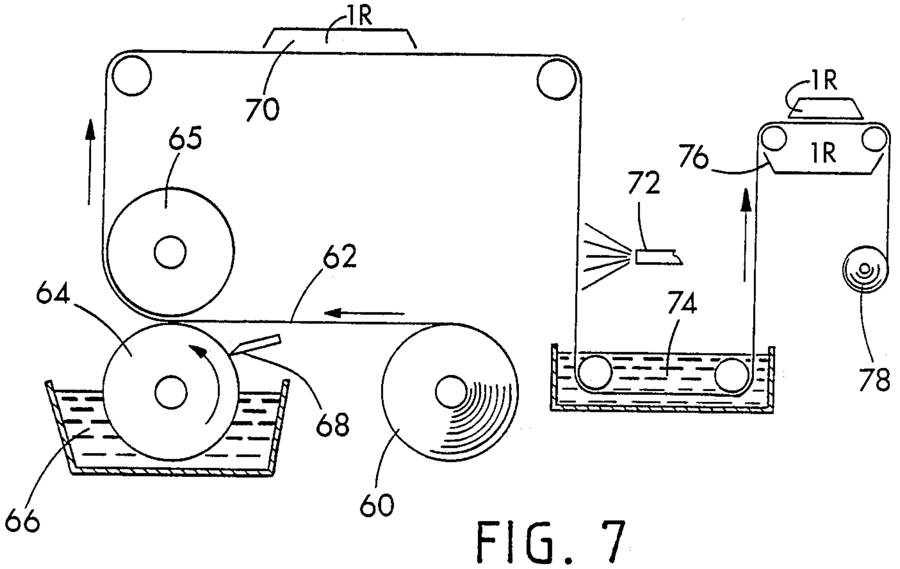
FIG. 7 is a schematic diagram illustrating one form of demetallization in accordance with the invention.

Refer now to FIG. 7 which illustrates a method employed for producing coated sheet material in accordance with one form of the present invention. As shown in the figure, a one-half mil strip of polyester film is unrolled from the supply roll 60, travels over a steel gravure roll 64 which contains a multiplicity of minute cavities or cells 64a that are filled as the roll 64 rotates with a caustic solution in bath 66. Excess solution is removed by a doctor blade 68. A suitable caustic solution is:

| | | |
|---|---|---|
| NaOH | 32 | lb |
| $H_2O$ | 186 | lb |
| Xanthan gum (Kelzan S ®) | 1,000 | ml |

Figure 7A:
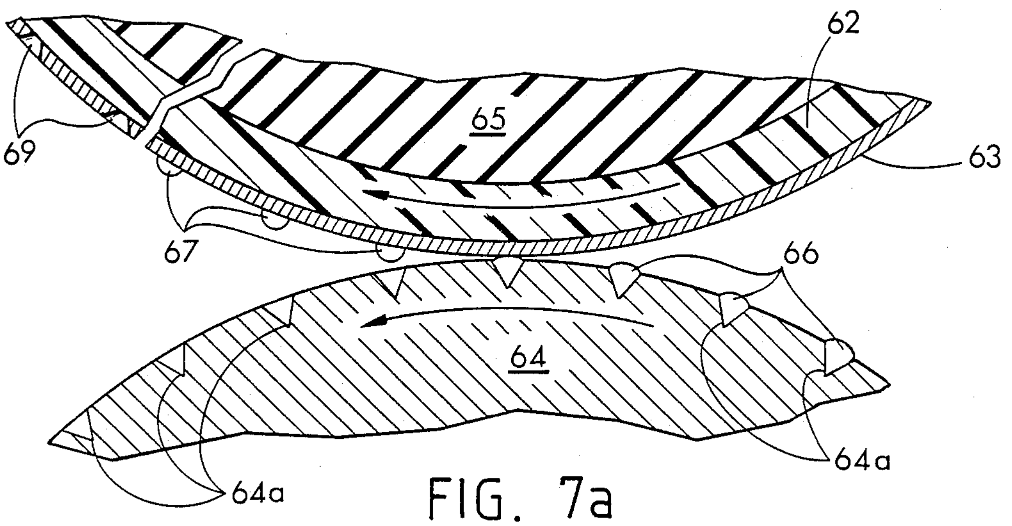
FIG. 7A is a greatly enlarged vertical sectional view showing the transfer of etchant from a carrier to a metal coated sheet.

In this way the caustic 66 contained in the cells 64a contacts the metal coating 63 supported by the plastic film 62 and transfers to the metal film (shown in FIG. 7A) as minute spaced apart droplets 67, e.g. 40 microns across, adhered to the metal coating 63 by capillary attraction. If desired, a flexographic roll can be used in place of the gravure roll.

In the alternative, the backing 62 can comprise a smooth paper or a paper having a smooth surface coating to which the metal film 63 is applied by vapor metallization under vacuum. The plastic film and metal coating 63 are forced into contact with the steel gravure roll 64 by means of a driven rubber backing roll 65. From the gravure roll 64 the film passes over idler rolls beneath an infrared heater 70 which warms the caustic slightly to assist in removing a portion of the metal film 63. The etchant remains on the film 63 for a few seconds, e.g. about 4 seconds. Next, the caustic solution and dissolved metal are removed by means of a water spray 72 and water bath 74. After passing through the water bath 74 which is filled with fresh circulating water, the film passes over additional idler rolls between a pair of infrared heaters 76 which remove excess moisture. The metal film 63 at this stage then contains a multiplicity of etched and patterned openings 69. The finished coated film is then wound into a roll 78.

Thus, in accordance with the present invention the etchant (or in an alternative form of the invention a protective varnish) is carried in machined or etched cells of a cylinder with varying degrees of etch in different areas. The degree of etching or machining will remove different amounts of metal from the roll. A deeper etching removes more metal and allows the resulting cells to carry more of the caustic solution onto the metal coated film.

The thin metal film 63 0is removed in this way by halftone printing which reduces the continuous tone coating of the original uniformly coated metal film 63 by the application of a pattern of variably sized dots of caustic solution 66 on uniform fixed centers. The gravure roll 64 is prepared in the manner of a printing roll to produce cells 64a of a desired size to produce caustic droplets of varying sizes depending upon the size of the cells 64a. When the cells 64a are increased in size more of the metal film 63 will be removed and consequently, less heat will usually be produced by the resulting halftone film. The cell size and the droplet values are in this way chosen and distributed uniformly by halftone printing accomplished with a gravure roll 64. While not critical, the halftone etching of metal from roll 64 in this case provides cells 64a arranged in an elongated Helio pattern with 250 lines of cells per inch. The cells 64a can be arranged in any desired pattern but typically have a count of about 25 to 500, and preferably 60 to 300, lines of cells per lineal inch. The cells 64a in the ring 20 can have a cross-section of about 38 microns and those in the ring 22 can be about 50 microns across.

In order to make sure that most of the caustic 66 exits the cells 64a, the surface tension of the sheet 62 can be adjusted, for example by exposing it to a corona discharge. The sheet 62 may originally have a surface tension of about 40 dynes/cm. This can be raised by corona treatment to at least about 50 dynes/cm and preferably to 60 dynes/cm or above. In this way the caustic 66 is transferred to the metal film 63 by capillary attraction. In one product of the type shown in FIG. 1, the ring 20 consisted of 17–18% open cell area and the ring 22 consisted of about 22% open cell area to produce openings 69.

In an alternative process, the continuous metal coating 63 is partially covered with a protective varnish applied in a pattern by halftone printing, for example as a pattern of dots or as a grid which covers the metal coating 63. After the varnish is dry, the entire surface is coated with caustic which dissolves the metal exposed between the varnish patterned areas.

Refer now to FIG. 8 which illustrates in graph form the temperatures reached in a 650 watt Litton microwave oven with no heat absorbing load. It will be seen that the center area in which little or no metal is removed heats most rapidly but that after 20 seconds the inner circle 20 reaches a higher temperature. The outer circle 22 becomes heated much more slowly but eventually reaches a temperature higher than the center area 18. The area 12 with no metal is the slowest in heating.

The optical density, light transmission and ohms per square for the three coated areas is given in the following table:

| Film Area (FIG. 1) | Optical Density (Tobias Densitometer, Model TBX) | Percent Light Transmission (Tobias Assoc. Conversion Chart; Ivyland, PA) | Ohms/Square |
|---|---|---|---|
| 18 | .23 | 58.9 | 217 |
| 20 | .18 | 66.1 | 1,666 |
| 22 | .11 | 77.6 | over 10,000 |

Figure 9:
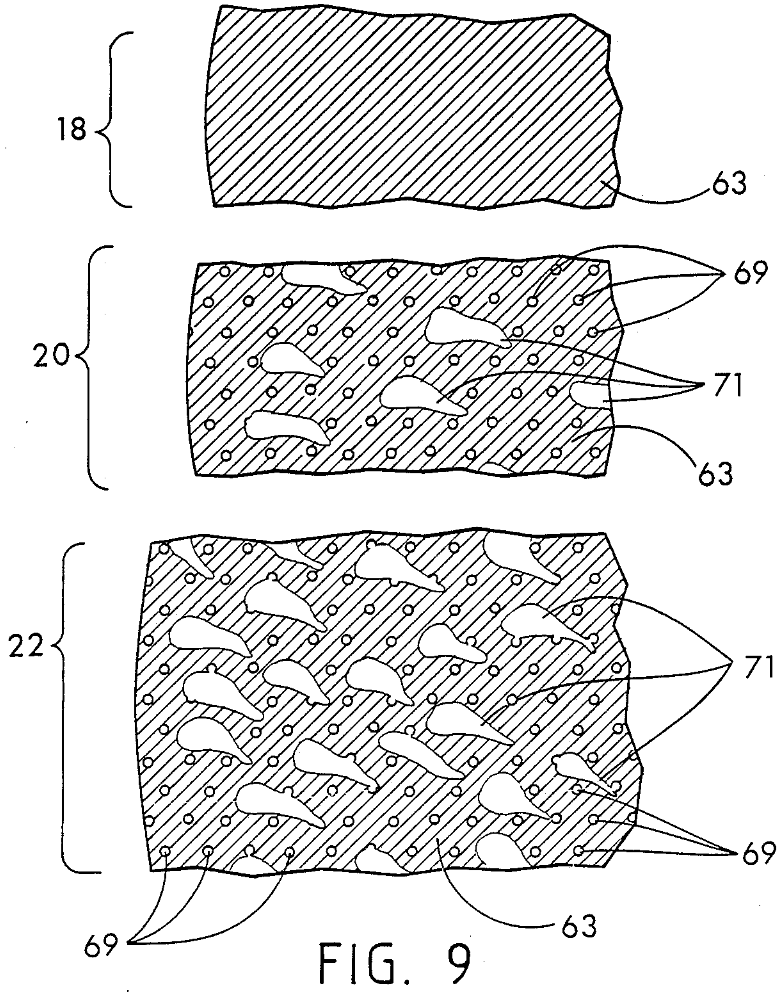
FIG. 9 is a diagrammatic microscopic plan view of the demetallized product of FIG. 1 at a magnification of approximately 60X.

As shown in FIG. 9, the metal coating 63 contains a hexagonal pattern of openings 69 each about 40 microns across arranged in an elongated helio pattern, in this case at uniformly spaced intervals. The rings 20 and 22 also contain regions 71 of microscopic size in which the metal coating 63 is either relatively thin or completely removed. As can be seen, the regions 71 are larger and more numerous in the ring 22 than they are in the ring 20, giving ring 22 a lower optical density than ring 20 or center area 18.

From the foregoing description it can be seen that in accordance with the present invention a thin metal film is partially removed by contacting the film with the surface of a roll such as a gravure roll or, if desired, a flexigraphic roll or other roll suitable for halftone printing which contains a multiplicity of microscopic cells containing varnish or a caustic etchant. The number of microscopic cells and the volume of each is varied so that more metal is removed in some areas, as area 22, than in other areas such as areas 18 and 20 of the sheet to provide patterned gradations in the amount of metal remaining on the metallized sheet. The resulting product produces graduated microwave heating and can also be used for decorative purposes.

In decorative packaging the metal coating is applied, for example, to cellophane or other transparent packaging sheet material with various coating thicknesses to provide gradations in the amount of metal remaining in the coating from one area to another. The invention can also be used for security purposes, for example as an insert making up a portion of a credit card as well as in passports, bills and currency. It can also be used as a radar absorbing material. Other non-food applications of the invention include box overwraps for clothing, lingerie, cosmetics, candies and snack foods, in which case the metallization will usually consist of a bright, highly reflective metallized coating.

The invention can be used for heating a variety of foods such as pizza, fruit pies, meat pies, breads, TV dinners, french fries, as well as batter covered foods. When used for heating, the flexible plastic backing is preferably laminated to a stiff or stable support such as paper or paperboard.

Many variations of the present invention within the scope of the appended claims will be apparent to those skilled in the art once the principles described herein are understood.

What is claimed is:

1. A process to produce a metal coated article having a metal film with gradations in light transmission thereon, said method comprising, providing a nonconductive substrate having a thin metal film thereon, removing different amounts of the metal film from different portions of the substrate to provide differences in the amount of metal film remaining in the different portions thereof whereby the different portions of the metal film exhibit differences in optical density.

2. The process of claim 1 wherein the metal is removed by exposing different parts of the metal film to an etchant in the form of minute etchant droplets with the etchant droplets being of different sizes in different portions of the metal film so as to remove more of the metal film in some parts thereof than in others.

3. The process of claim 2 wherein the droplets are from about 10 microns to 500 microns across.

4. The process of claim 1 wherein an etchant is applied to a carrier, the carrier is brought into contact with the metal film and the etchant transfers from the carrier to the metal film by capillary attraction, said etchant is then removed from the substrate to carry away a portion of the metal contained in the film.

5. A process to produce a microwave heating susceptor for heating material to different temperatures in different areas thereof, said method comprising, providing a nonconductive flexible substrate having a thin, semiconductive metal film thereon, the metal film of said susceptor being adapted to produce heat when the susceptor is placed in a microwave oven, changing the amount of heat produced in different areas of the susceptor by removing different amounts of said metal film in different regions thereof to provide differences in the resistivity and in the optical density of the metal film in the different areas thereof whereby the different areas of the metal film produce different heat effects when exposed to microwave energy in a microwave oven.

6. The process of claim 5 wherein the metal film is removed by exposing different parts of the metal film to different amounts of an etchant.

7. The method of claim 6 wherein the etchant is applied in the form of minute droplets of one size in one area of the susceptor and of a different size in a different area of the susceptor so as to remove more metal in one area of the metal film than in another.

8. The process of claim 7 wherein the droplets are from about 10 microns to about 500 microns across.

9. The process of claim 5 wherein the metal is removed by halftone printing of an etchant onto the metal film, said etchant being applied as variably sized dots on uniform fixed centers and wherein larger dots of the etchant are applied in some areas than in others to create differences in the amount of heat produced in some areas than in others.

10. The process of claim 5 wherein droplets of an etchant are applied to a carrier, the carrier is brought into contact with the metal film and the droplets transfer from the carrier to the metal film by capillary attraction, said droplets are then removed from the metal film and thereby carry away a portion of the metal contained in the film.

11. The process of claim 7 wherein a plurality of different areas of droplets are provided including a first zone of droplets of one size to cover a selected fraction of the metal film and a second area with droplets of a larger size to cover a different fraction of the metal film in a second zone to thereby produce less microwave heating in the second zone than in the first zone.

12. The process of claim 6 wherein the metal is selected from the group consisting of aluminum, copper, nickel, zinc, tin, gold, silver and stainless steel and the etchant is a caustic liquid adapted to dissolve the metal.

13. The process of claim 6 wherein the susceptor and etchant are heated after the etchant is applied and the etchant is then washed away from the film.

14. The process of claim 5 wherein the removal of metal from the film produces gradations in the amount of metal remaining in different areas with the greatest amount remaining in the center and declining amounts remaining in areas proceeding toward the periphery of the susceptor.

* * * * *

UNITED STATES PATENT AND TRADEMARK OFFICE
CERTIFICATE OF CORRECTION

PATENT NO. : B1 4,959,120

DATED : July 21, 1992

INVENTOR(S) : David Wilson

It is certified that error appears in the above-identified patent and that said Letters Patent is hereby corrected as shown below:

Please ADD the following information to the cover page of the Reexamination Certificate:

--Assignee: Golden Valley Microwave Foods, Inc.,
Edina, Minnesota--

Signed and Sealed this

Sixteenth Day of February, 1993

*Attest:*

STEPHEN G. KUNIN

*Attesting Officer* *Acting Commissioner of Patents and Trademarks*

US004959120B1

REEXAMINATION CERTIFICATE (1757th)

United States Patent [19]

[11] B1 4,959,120

Wilson

[45] Certificate Issued Jul. 21, 1992

[54] DEMETALLIZATION OF METAL FILMS

[76] Inventor: David Wilson, Mississauga, Canada

Reexamination Request:
No. 90/002,404, Aug. 19, 1991

Reexamination Certificate for:
Patent No.: 4,959,120
Issued: Sep. 25, 1990
Appl. No.: 369,193
Filed: Jun. 21, 1989

[51] Int. Cl.[5] .......................... B44C 1/22; C23F 1/02; C05C 15/00; C05C 25/06

[52] U.S. Cl. .................................... 156/651; 156/656; 156/659.1; 156/665; 428/209

[58] Field of Search ..................... 156/651, 656, 659.1, 156/665, 345; 219/10.55 E; 428/195, 209, 156, 170, 172; 427/259, 264, 270, 271

[56] References Cited

U.S. PATENT DOCUMENTS 4,915,780 4/1990 Beckett ............................ 156/661.1

*Primary Examiner*—William A. Powell

[57] ABSTRACT

A selectively demetallized metal film is provided in which the metal film has different amounts of metal removed in different areas to provide a film having a graduated optical density from one area to another. The amount of metal present in the film can vary gradually and continuously or in stages resulting in a series of bands or patches. Each portion of the film appears uniform, homogeneous and uninterrupted to the unaided eye. The product is produced by providing a substrate such as plastic film having a thin semiconductive metal film coated thereon. Different amounts of the metal are removed from the film in different areas, preferably by exposing the metal film in different areas to different amounts of an etchant which can be provided in the form of minute droplets of one size in one area and of a different size in a different area. The etchant can be applied by halftone printing as variably sized dots on uniformly fixed centers with larger dots of etchant applied in some areas than in others to remove a greater amount of the metal.

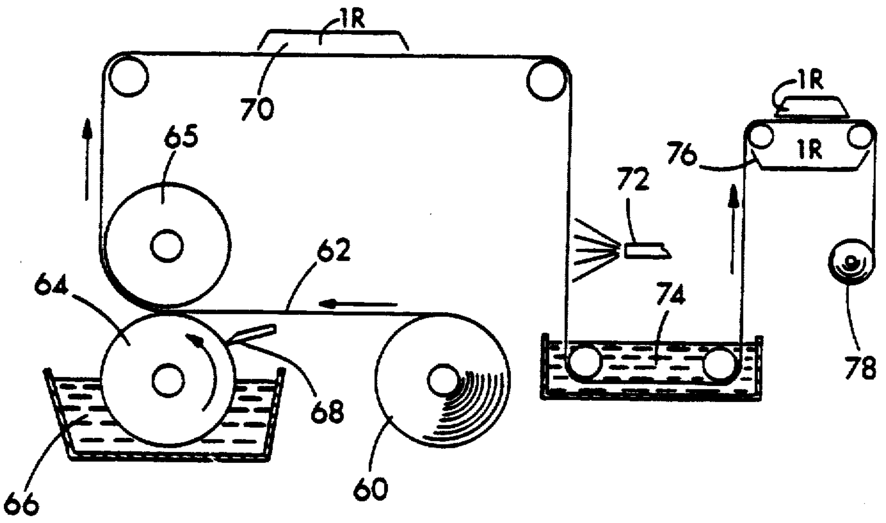

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-14 are cancelled.

New claims 15-27 are added and determined to be patentable.

*15. A process for the production of a metal coated article having a metal film with gradations in light transmission thereon, said method comprising the steps of:*

*(a) providing a nonconductive substrate having a thin metal film thereon, the thin metal film having a surface of exposed metal; and*

*(b) removing different amounts of the metal film from different portions of the substrate to provide differences in the amount of metal film remaining in the different portions thereof; said step of removing different amounts of the metal film including applying different amounts of etchant solution to different areas of the surface of exposed metal without the use of an etchant-resistant material applied to the surface of exposed metal;*

*(c) whereby the different portions of the metal film exhibit differences in optical density.*

*16. A process according to claim 15 wherein the etchant is applied to the metal film in spaced apart quantities, to etch the metal film by different amounts in different portions thereof.*

*17. A process according to claim 15 wherein: the step of removing diffeent amounts of the metal comprises exposing different parts of the surface of exposed metal to etchant in the form of minute etchant droplets, with etchant droplets on different portions of the metal film being of different average size.*

*18. A process according to claim 17 wherein the minute droplets of etchant are applied to the metal surface by halftone printing.*

*19. A process according to claim 17 wherein the minute droplets are sized from about 10 microns to 500 microns across.*

*20. A process according to claim 17 wherein said step of removing different amounts of film from different portions of the substrate includes: a step of transferring etchant, to the surface of exposed metal, by capillary attraction from a carrier; and, a step of washing the etchant from the metal film.*

*21. A process for the production of a microwave heating susceptor for heating material to different temperatures in different areas thereof; said method comprising the steps of:*

*(a) providing a nonconductive flexible substrate having a thin, semiconductor metal film thereon;*

*(i) the thin metal film having a surface of exposed metal;*

*(ii) the metal film of the susceptor being adapted to produce heat when the susceptor is exposed to microwave energy in a microwave oven; and,*

*(b) changing the amount of heat produced in different areas of the susceptor by removing different amounts of the metal film from different regions thereof, to provide regions of different resistivity and optical density in the metal film thereat; said step of removing different amounts of the metal film including applying different amounts of etchant solution to different areas of the surface of exposed metal without the use of an etchant-resistant material applied to the surface of exposed metal;*

*(c) whereby the different areas of the metal film produce different heat effects when exposed to microwave energy in a microwave oven.*

*22. A process according to claim 21 wherein: the step of removing different amounts of the metal comprises exposing different parts of the surface of exposed metal to etchant in the form of minute etchant droplets, with etchant droplets on different portions of the metal film being of different average size.*

*23. A process according to claim 22 wherein the minute droplets of etchant are applied to the metal surface by halftone printing.*

*24. A process according to claim 21 wherein the minute droplets are sized from about 10 microns to 500 microns across.*

*25. A process according to claim 21 wherein said step of removing different amounts of film from different portions of the substrate includes: a step of transferring etchant, to the surface of exposed metal, by capillary attraction from a carrier; and, a step of washing the etchant from the metal film.*

*26. A process according to claim 21 wherein said step of providing a nonconductive substrate having a thin metal film thereon comprises providing a substrate having a film consisting of aluminum, copper, nickel, zinc, tin, gold, silver, stainless steel or mixtures thereof.*

*27. A process according to claim 21 wherein said step of removing different amounts of metal includes generating a susceptor with a central portion having a greatest amount of metal remaining and an outer periphery with less metal remaining than in the central portion.*

* * * * *